United States Patent [19]

Williams

[11] Patent Number: 4,938,446

[45] Date of Patent: Jul. 3, 1990

[54] FISHING ROD SUPPORT

[76] Inventor: James L. Williams, 15215 No. 5325 West (Box 101), Riverside, Utah 84334

[21] Appl. No.: 316,147

[22] Filed: Feb. 27, 1989

[51] Int. Cl.⁵ .............................................. A01K 97/10
[52] U.S. Cl. ....................................... 248/530; 43/21.2
[58] Field of Search ............... 248/545, 519, 520, 530, 248/532, 533, 538, 156, 175, 302; D 22/147; 43/21.2

[56] References Cited

U.S. PATENT DOCUMENTS

| D. 100,600 | 7/1936 | Luff | 43/21.2 |
|---|---|---|---|
| D. 190,330 | 5/1961 | Carothers | 248/530 |
| 1,876,478 | 6/1932 | Van Duzer | 248/538 |
| 2,202,739 | 5/1940 | Kilby | 248/530 |
| 2,519,612 | 8/1950 | Tuttle | 248/156 |
| 2,621,877 | 12/1952 | Grigsby | 43/21.2 |
| 2,751,174 | 6/1956 | Parker | 248/545 |
| 2,888,220 | 5/1959 | Rose | 248/175 |
| 3,020,014 | 2/1962 | Emery | 248/533 |
| 3,669,390 | 6/1972 | Nielson | 248/538 |
| 3,835,568 | 9/1974 | Whitfield | 248/545 |

FOREIGN PATENT DOCUMENTS

| 520986 | 1/1956 | Canada | 248/538 |
|---|---|---|---|
| 900574 | 7/1962 | United Kingdom | 43/21.2 |
| 2015851 | 9/1979 | United Kingdom | 43/21.2 |

Primary Examiner—Alvin C. Chin-Sue
Assistant Examiner—Robert A. Olson
Attorney, Agent, or Firm—A. Ray Osburn

[57] ABSTRACT

A fishing rod support having a pair of tines connected by a horizontal member adapted for purchase of the foot to set the tines into the soil. A spaced apart pair of upwardly and downwardly opening rod cradles allow the rod to be positioned within the cradles to clear the reel for unobstructed use.

4 Claims, 2 Drawing Sheets

FISHING ROD SUPPORT

BACKGROUND OF THE INVENTION

1. Field

The field of the invention is fishing accessories and more particularly devices permitting use of fishing rods without manual support.

2. State of the Art

The fisherman's problem of supporting the fishing pole or rod without hands and without constant attention while waiting for the fish to bite has resulted in various attempted solutions. Sometimes, the rod is laid directly on the ground of the bank next to the water. However, with this solution, the rod does not twist and bend visibly when a fish is hooked. More likely, the rod or pole will be pulled into the water. Attempts to prop the rod securely in an upwardly inclined position with rocks and the like are more frustrating than effective. Planting the pole by punching its handle end into the ground meets with similar discouraging results, especially when the soil is dry or rocky. A typical prior art pole support device incorporates a pole engaging socket and cradle affixed to the upper end of a spike intended to pierce the ground to provide anchorage for the support. A single spike is generally used, providing little resistance to rotational displacement. With these supports, the pole is easily twisted out of position. To combat this tendency, angle iron spikes are sometimes used. These are very difficult to set into the ground because of their large cross-sectional area. The use of thin metal angles reduces the necessary insertion force, but dangerously weakens the device. These prior art supports are, in any event, difficult to insert, since they provide only for the use of the hands for this purpose. The socket and cradle construction requires longitudinal motion to insert the end of the pole into the socket. Large sockets must be provided to accommodate the large diameter handles of many rod designs; smaller handles are accordingly supported very loosely. The socket and cradle support allows only one position of the rod, often leading to lack of clearance for the reel with many handle and reel mounting arrangements.

BRIEF SUMMARY OF THE INVENTION

With the foregoing in mind, the disadvantages and shortcomings of prior art fishing rod supports are eliminated or substantially alleviated in the present invention. The inventive support comprises a pair of parallel tines to which is affixed a pair of spaced apart rod cradles, one upwardly and one downwardly facing, along with means for setting the tines into the soil by pressure of the foot.

In the preferred embodiment, the inventive support has a vertical spine, to the lower portion of which is affixed a coplanar ell member. The vertical leg of the ell forms, with the lower portion of the spine, the pair of downwardly directed parallel tines. Another ell member is secured coplanar with the spine at a higher level, with its vertical leg in this case directed upwardly. Preferably, the plane of the upper ell is perpendicular to the plane of the lower ell. Affixed to the top of the spine is an upwardly opening rod cradle, which cooperates with a downwardly opening cradle affixed to the vertical member of the uppermost ell. Because of the weight of the lengthy rod affixed to the handle, the rod and handle assembly are effectively supported by downward force upon the spine cradle and upward force on the ell cradle.

Because there is no socket, the rod may be supported selectively along the length of its handle, to provide clearance and access to the reel regardless of its location on the rod. The rod is also easily mounted upon the support by a sidewise motion, no longitudinal socket insertion being necessary. The horizontal member of the uppermost ell is preferably secured sufficiently low so that the reel may be fitted into the space between the spine and the ell if desired.

Advantageously, the support is constructed throughout of steel rod material. The cradles may, if desired, be formed by bending of the rod ends. Or, they may be affixed by welding or the like. Because of the spaced apart tines, rotation of the support in the soil is effectively resisted, to hold the pole permanently in the desired direction. The horizontal leg of the lowermost ell provides purchase of the user's foot to insert the tines into the soil It is therefore the object of the invention to provide an improved fishing rod support, which provides for firm anchoring into the soil by use of the foot, resists subsequent rotation, and effectively supports various rod and reel combinations.

BRIEF DESCRIPTION OF THE DRAWINGS

In the drawings, which represent the best mode presently contemplated for carrying out the invention, FIG. 1 a perspective view of a fishing rod support in accordance with the invention shown in use supporting a fishing rod upon the bank of a body of water, drawn to a reduced scale, FIG. 2 a side elevation view of the rod support of FIG. 1, taken along line 2—2 thereof, drawn to approximately the same scale, FIG. 3 a front elevation view of the rod support of FIG. 2, taken along line 3—3 thereof, drawn to the same scale, and FIG. 4 a perspective representation of a fragment of the rod support of FIG. 3, shown with the tines thereof being set into the ground by the pressure of the fisherman's foot, drawn to approximately the scale of FIG. 3.

DETAILED DESCRIPTION OF ILLUSTRATED EMBODIMENTS

Figure 1:
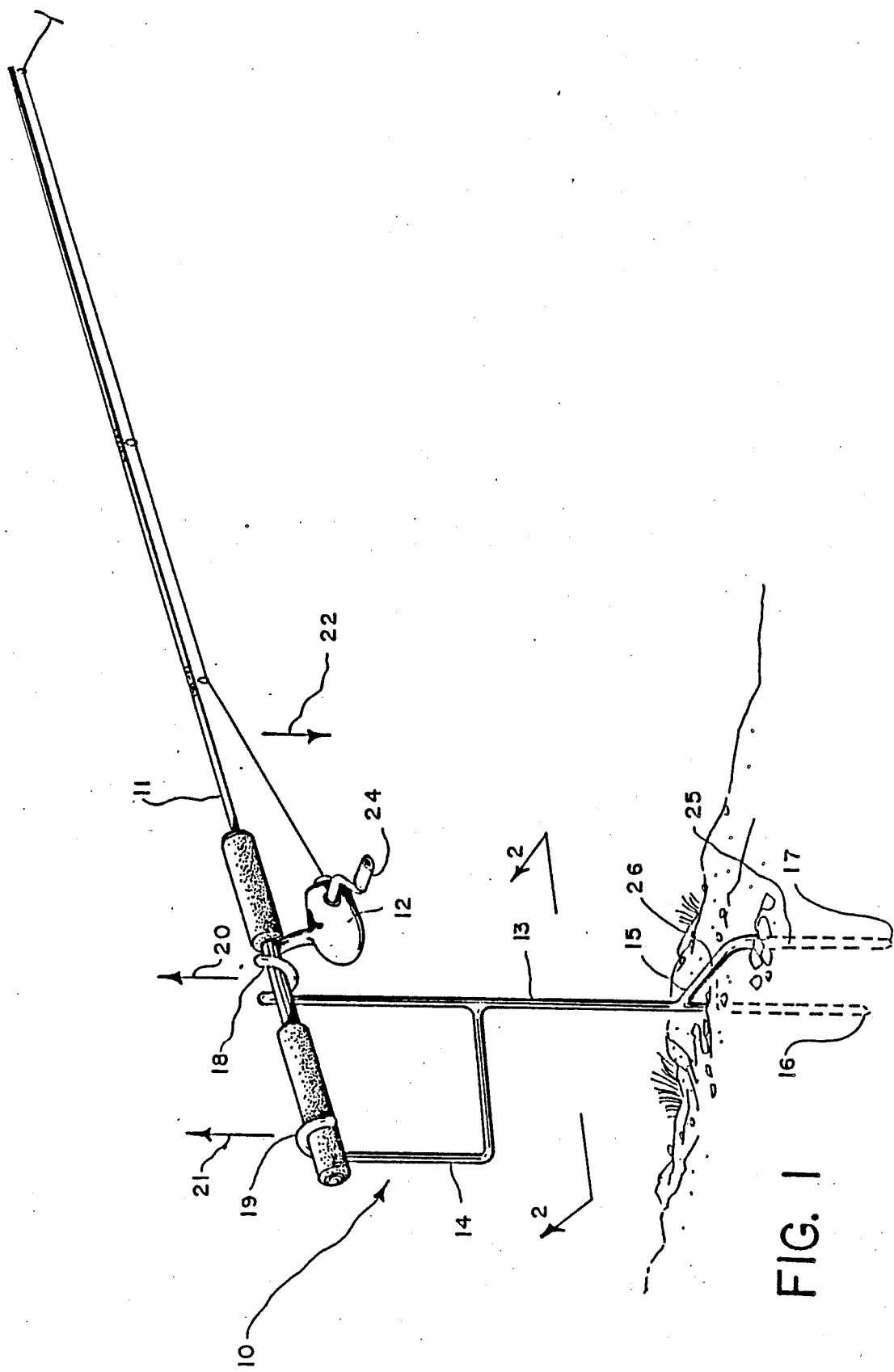
Figure 2:
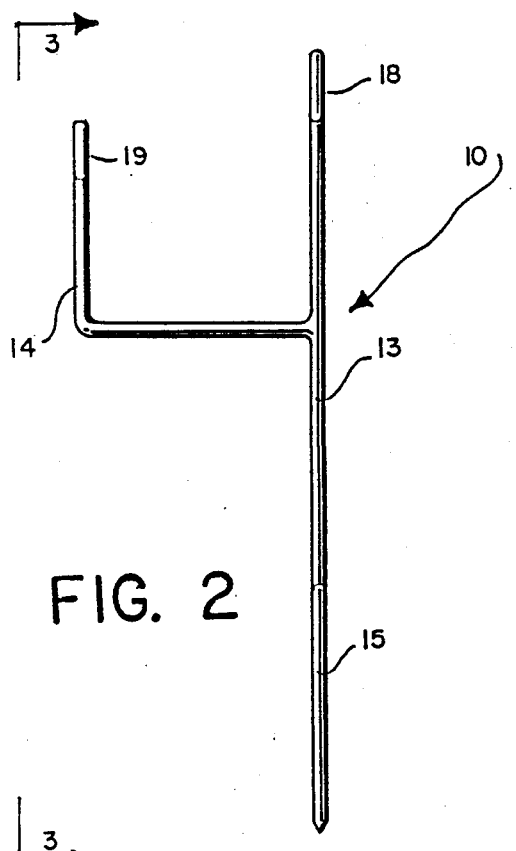
Figure 3:
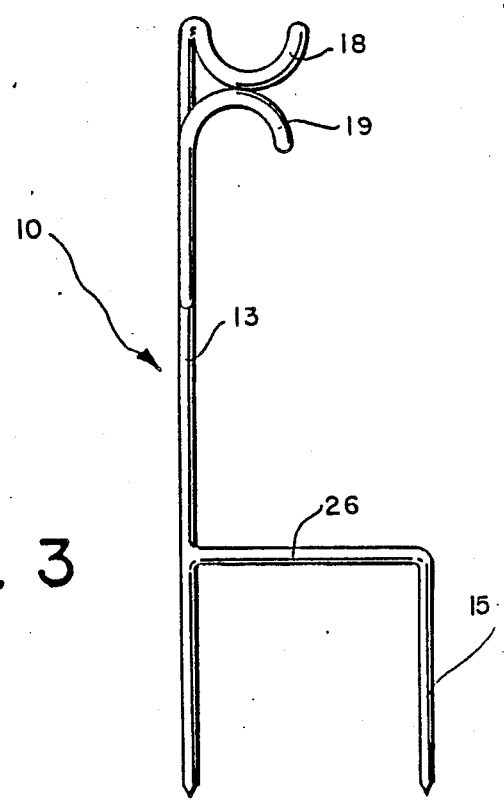
Figure 4:
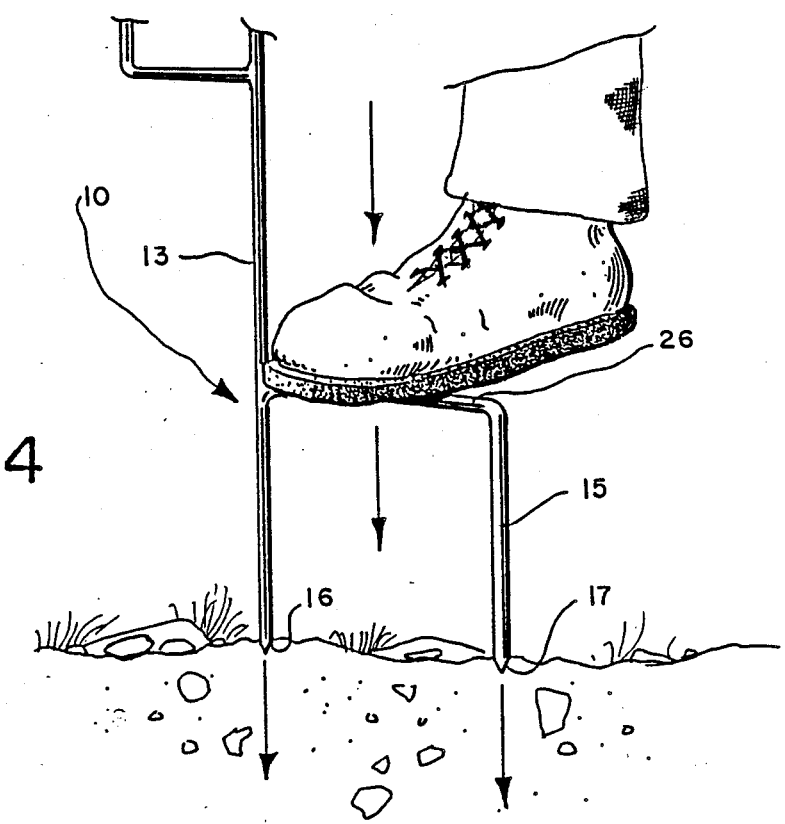

The inventive fishing pole and rod holder 10 is described in detail with reference to the drawings, wherein like parts are indicated by like numbers throughout. In FIG. 1, the rod support 10 is shown in use anchored firmly into the ground of a river bank or the like, supporting a rod assembly 11 with an attached reel 12.

The illustrated holder 10 is constructed entirely of metal rod. Holder 10 comprises an elongate spine 13 and weld-attached upper and lower ell members 14 and 15 respectively. Lowermost ends 16 and 17 of spine 13 and ell 15 are sharpened to facilitate penetration of dry, caked, and rock laden soils. The uppermost end of spine 13 is formed into a semicircular, upwardly opening cradle 18, whereas the top end of ell 14 is bent to provide a similar but downwardly opening cradle 19. Spaced apart cradles 18 and 19 support rod 11 by upward force 20 and downward force 21, providing a force couple to resist the weight 22 of rod 11 and reel 12 acting through their combined center of gravity 23. Preferably, cradle 19 is somewhat lower than cradle 18, imparting an upward slope to rod 11, to enhance its visibility by assuring that it will curve substantially under the force of a tugging fish.

Because of the oppositely facing pair of cradles 18 and 19, rod 11 may be supported along its length as necessary to clear reel 12 for easy use of reel handle 24, unobstructed by any part of rod holder 10. Since rod 11 is mounted by sidewise placement into cradles 18 and 19, reel 12 encounters no obstruction whether located between or outside the cradles.

Preferably, upper ell 14 and lower ell 15 are secured to spine 13 perpendicularly to each other. This eliminates any interference with the foot, and assures that both tines fully resist being pulled from the soil by a vigorously tugging fish.

Spine 13 and vertical leg 25 of lower ell 15 are substantially spaced apart. This not only provides resistance to rotation of holder 10, but provides a horizontal member 26 for purchase of the fisherman's foot to press tines 16 and 17 into the soil. The entire weight of the user may be applied if necessary. However, the slender rodular tines easily penetrate most soils.

The invention may be embodied in other forms and materials than those illustrated and described. Although the metallic rod construction is preferred, other structural shapes such as angles or tubes could be utilized, although with considerable sacrifice of ground piercing ability. Although the metallic construction, preferably steel, is preferred for its strength, design for construction of plastic may be feasible, especially of those utilizing glass fiber or other reinforcement.

The invention may be embodied in other specific forms without departing from the spirit or essential characteristics thereof. The present embodiments are therefore to be considered as illustrative and not restrictive, the scope of the invention being indicated by the appended claims rather than by the foregoing description, and all changes that come within the meaning and range of equivalency of the claims are therefore intended to be embraced therein.

What is claimed and desired to be secured by U.S. Letters Patent is:

1. A fishing rod support comprising:
   a pair of parallel, vertical tines;
   a horizontal member joining the pair of tines in spaced apart relationship;
   a pair of parallel, spaced apart, rod accepting cradles joined to the paired tines, one of said cradles opening upwardly and the other downwardly; said pair of cradles being mounted substantially above the horizontal member, one thereof upon an upward extension substantially colinear with one of the paired tines and the other cradle is carried upon a member rigidly secured to the tine member extension; wherein
   said horizontal member is adapted to provide purchase of the foot to set the tines into the soil.

2. The rod support of claim 1, wherein:
   the cradle carrying member is in the shape of an ell, a horizontal leg thereof being secured to the tine member extension and the vertical member being parallel to said extension; and
   the cradle is carried upon the vertical leg of the ell.

3. The rod support of claim 2, wherein:
   the plane of the cradle carrying ell is perpendicular to the plane of the tines.

4. The rod support of claim 3 wherein:
   the support is constructed throughout of metallic rod.

* * * * *